(12) United States Patent
Yamada (10) Patent No.: US 11,279,237 B2
(45) Date of Patent: Mar. 22, 2022

(54) VEHICLE

(71) Applicant: TOYOTA JIDOSHA KABUSHIKI KAISHA, Toyota (JP)

(72) Inventor: Hidenori Yamada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 139 days.

(21) Appl. No.: 16/818,000

(22) Filed: Mar. 13, 2020

(65) Prior Publication Data

US 2020/0298706 A1 Sep. 24, 2020

(30) Foreign Application Priority Data

Mar. 18, 2019 (JP) .............................. JP2019-049568

(51) Int. Cl.
*B60L 8/00* (2006.01)
*B60L 53/62* (2019.01)
*B60L 53/51* (2019.01)
*H02J 7/00* (2006.01)
*B60L 3/04* (2006.01)

(52) U.S. Cl.
CPC ................ *B60L 8/003* (2013.01); *B60L 3/04* (2013.01); *B60L 53/51* (2019.02); *B60L 53/62* (2019.02); *H02J 7/00304* (2020.01); *H02J 2300/24* (2020.01); *H02J 2310/48* (2020.01)

(58) Field of Classification Search
CPC .......... B60L 8/003; B60L 53/62; B60L 53/51; B60L 3/04; H02J 2310/48; H02J 2300/24; H02J 7/00304
See application file for complete search history.

(56) References Cited

U.S. PATENT DOCUMENTS

2006/0220610 A1* 10/2006 Solberg ................... B60L 55/00
320/105
2018/0201150 A1 7/2018 Kubo et al.

FOREIGN PATENT DOCUMENTS

JP 2015-201995 A 11/2015
JP 2018-117436 A 7/2018

* cited by examiner

*Primary Examiner* — David V Henze-Gongola
(74) *Attorney, Agent, or Firm* — Sughrue Mion, PLLC (57) ABSTRACT

There is provided a vehicle comprising a motor for driving; a power storage device configured to transmit electric power to and from the motor; a solar system configured to generate electric power from sunlight and to perform solar charging that supplies the generated electric power to the power storage device; and a charging relay turned on and off to connect and disconnect the solar system with and from the power storage device. When a short circuit fault occurring on a solar system side of the charging relay is detected in an on state of the charging relay in a current trip, the vehicle turns off the charging relay and keeps the charging relay off at least in the current trip. This configuration enables the vehicle to be driven even in the case where a short circuit fault occurs in the solar system or the like.

4 Claims, 4 Drawing Sheets

VEHICLE

CROSS-REFERENCE TO RELATED APPLICATION

This application claims priority to Japanese Patent Application No. 2019-049568 filed on Mar. 18, 2019, the contents of which is incorporated herein by reference.

TECHNICAL FIELD

The present disclosure relates to a vehicle.

BACKGROUND

A proposed configuration of a vehicle includes a motor for driving, a main battery configured to transmit electric power to and from the motor, and a solar system (as described in, for example, JP 2015-201995A). The solar system includes a solar charging unit configured to receive the sunlight and generate electric power, a solar battery configured to accumulate therein the electric power generated by the solar charging unit, and a boosting DC/DC converter configured to step up the voltage of electric power of the solar battery and supply the electric power of the stepped-up voltage to the main battery.

CITATION LIST

Patent Literature

PTL 1: JP2015-201995A

With a view to extending a drivable distance of the vehicle, the vehicle may perform solar charging to supply the electric power from the solar system to the main battery during a trip. When a short circuit fault occurs in the solar system (for example, the boosting DC/DC converter), electric current flows from the main battery to the short circuit position. This is likely to cause a failure in output of a torque from the motor and make it difficult to drive the vehicle with a torque output from the motor.

A main object of the present disclosure is to enable a vehicle to be driven even when a short circuit fault occurs in a solar system or the like.

SUMMARY

In order to achieve the above primary object, the vehicle of the disclosure is implemented by an aspect described below.

The present disclosure is directed to a vehicle. The vehicle includes a motor for driving, a power storage device configured to transmit electric power to and from the motor, a solar system configured to generate electric power from sunlight and to perform solar charging that supplies the generated electric power to the power storage device, a charging relay turned on and off to connect and disconnect the solar system with and from the power storage device, and a control device configured to control the motor, the solar system and the charging relay. When a short circuit fault occurring on a solar system side of the charging relay is detected in an on state of the charging relay in a current trip, the control device turns off the charging relay and keeps the charging relay off at least in the current trip.

When a short circuit fault on the solar system side of the charging relay is detected in the on state of the charging relay in the current trip, the vehicle according to the above aspect of the present disclosure turns off the charging relay and keeps the charging relay off at least in the current trip. This configuration maintains the disconnection between the power storage device side of the charging relay and the solar system side of the charging relay. Even in the case where a short circuit fault occurs on the solar system side of the charging relay, this configuration enables the vehicle to be driven as in the case where no short circuit fault occurs.

DESCRIPTION OF EMBODIMENTS

The following describes some aspects of the present disclosure with reference to an embodiment.

Figure 1:
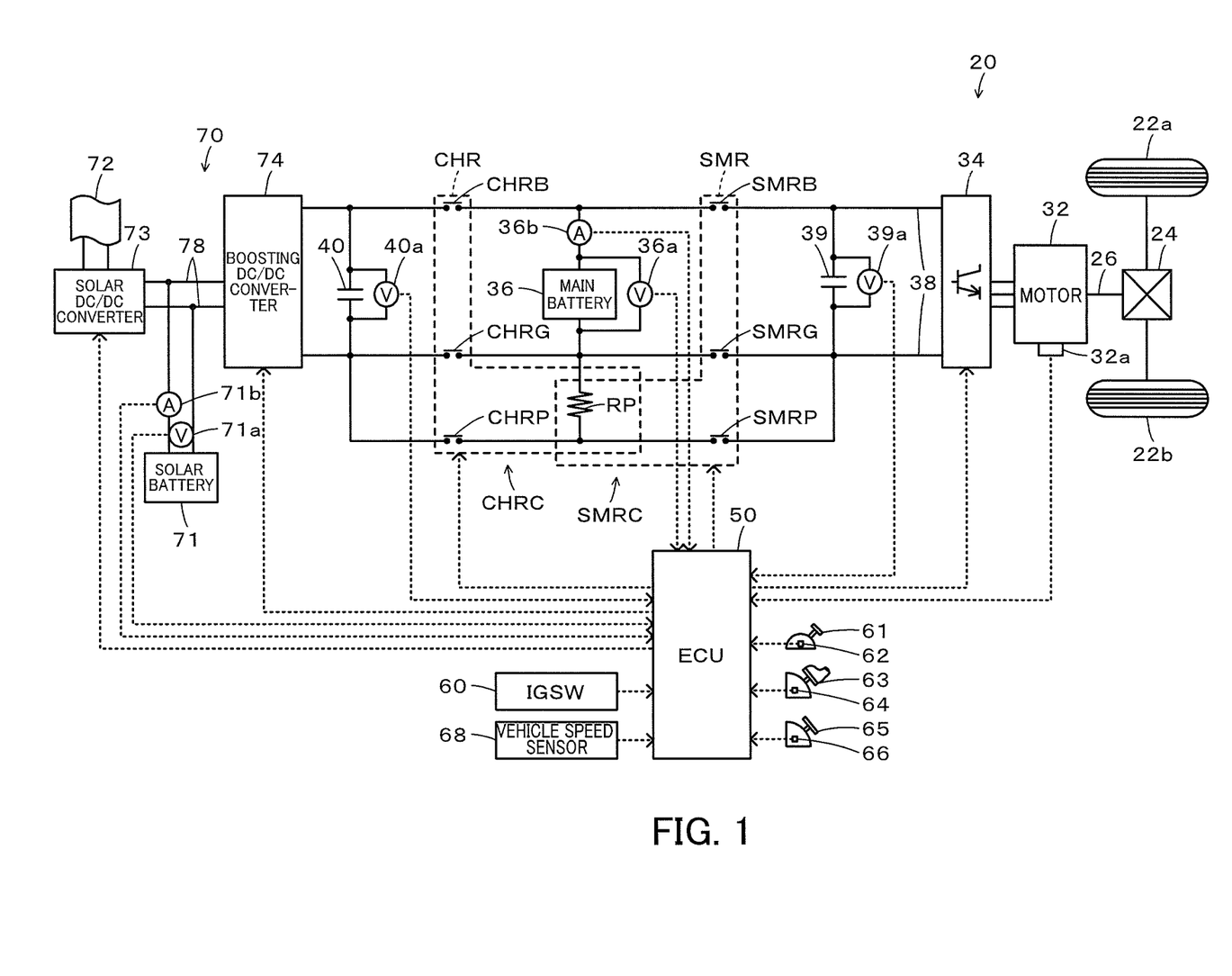
FIG. 1 is a configuration diagram illustrating the schematic configuration of an electric vehicle according to one embodiment of the present disclosure.

FIG. 1 is a configuration diagram illustrating the schematic configuration of an electric vehicle 20 according to one embodiment of the present disclosure. As illustrated, the electric vehicle 20 of the embodiment includes a motor 32, an inverter 34, a main battery 36 serving as a power storage device, a system main relay SMR, a charging relay CHR, a solar system 70 and an electronic control unit (hereinafter referred to as "ECU") 50.

The motor 32 is configured as, for example, a synchronous generator motor and is connected with a driveshaft 26 that is linked with drive wheels 22a and 22b via a differential gear 24. The inverter 34 is used to drive the motor 32 and is connected with power lines 38. The ECU 50 performs switching control of a plurality of switching elements (not shown) included in the inverter 34, so as to rotate and drive the motor 32.

The main battery 36 is configured as, for example, a lithium ion rechargeable battery or a nickel metal hydride battery having a rated voltage of, for example, 200 V or 250 V and is connected with the power lines 38. A capacitor 39 is placed on an inverter 34-side of the main battery 36 in the power lines 38. A capacitor 40 is placed on the solar system 70-side (or more specifically, a boosting DC/DC converter 74-side) of the main battery 36 in the power lines 38.

The system main relay SMR is provided between the main battery 36 and the inverter 34 along with the capacitor 39 in the power lines 38. This system main relay SMR includes a positive electrode-side relay SMRB provided in a positive electrode-side line of the power lines 38; a negative electrode-side relay SMRG provided in a negative electrode-side line of the power lines 38; and a precharge circuit SMRC including a precharge resistance RP and a precharge relay SMRP that are connected in series to bypass the negative electrode-side relay SMRG. The ECU 50 controls ON and OFF the system main relay SMR, such as to connect and disconnect the main battery 36-side with and from the inverter 34- and the capacitor 39-side.

The charging relay CHR is provided between the main battery 36 and the boosting DC/DC converter 74 of the solar system 70 along with the capacitor 40 in the power lines 38. This charging relay CHR includes a positive electrode-side relay CHRB provided in the positive electrode-side line of the power lines 38; a negative electrode-side relay CHRG provided in the negative electrode-side line of the power lines 38; and a precharge circuit CHRC including the precharge resistance RP and a precharge relay CHRP that are connected in series to bypass the negative electrode-side relay CHRG. The precharge resistance RP is shared by the precharge circuit SMRC and the precharge circuit CHRC. The ECU 50 controls ON and OFF the charging relay CHR, such as to connect and disconnect the main battery 36-side with and from the boosting DC/DC converter 74- and the capacitor 40-side.

The solar system 70 includes a solar battery 71, a solar panel 72, a solar DC/DC converter 73, and the boosting DC/DC converter 74. The solar battery 71 is configured as, for example, a nickel metal hydride battery having a rated voltage of, for example, 20 V and is connected with power lines 78. The solar panel 72 is placed on, for example, a roof of the vehicle to generate electric power from the sunlight. The solar DC/DC converter 73 is connected with the solar panel 72 and with the power lines 78. This solar DC/DC converter 73 is controlled by the ECU 50 to perform voltage conversion of the electric power generated by the solar panel 72 and supply the voltage-converted electric power to the power lines 78 (such as to be accumulated into the solar battery 71). The boosting DC/DC converter 74 is connected with the power lines 78 and with the power lines 38. This boosting DC/DC converter 74 is controlled by the ECU 50 to step up the electric power of the power lines 78 and supply the stepped-up electric power to the power lines 38.

The ECU 50 is configured as a CPU-based microprocessor and includes a ROM configured to store processing programs, a RAM configured to temporarily store data and input/output ports, in addition to the CPU, although not being illustrated. Signals from various sensors are input into the ECU 50 via the input port. The signals input into the ECU 50 include, for example, a rotational position θm of a rotor of the motor 32 from a rotational position sensor 32a configured to detect the rotational position of the rotor of the motor 32 and electric currents Iu, Iv and Iw of respective phases of the motor 32 from current sensors configured to detect the electric currents flowing in the respective phases of the motor 32. The input signals also include a voltage Vmb of the main battery 36 from a voltage sensor 36a placed between terminals of the main battery 36 and an electric current Imb of the main battery 36 from a current sensor 36b mounted to an output terminal of the main battery 36. The input signals further include a voltage VH1 of the capacitor 39 from a voltage sensor 39a placed between terminals of the capacitor 39 and a voltage VH2 of the capacitor 40 from a voltage sensor 40a placed between terminals of the capacitor 40. The input signals also include a voltage Vsb of the solar battery 71 from a voltage sensor 71a placed between terminals of the solar battery 71 and an electric current Isb of the solar battery 71 from a current sensor 71b mounted to an output terminal of the solar battery 71. The input signals additionally include an ignition signal from an ignition switch 60, a shift position SP from a shift position sensor 62 configured to detect an operating position of a shift lever 61, an accelerator position Acc from an accelerator pedal position sensor 64 configured to detect a depression amount of an accelerator pedal 63, a brake pedal position BP from a brake pedal position sensor 66 configured to detect a depression amount of a brake pedal 65, and a vehicle speed V from a vehicle speed sensor 68.

Various control signals are output from the ECU 50 via the output port. The signals output from the ECU 50 include, for example, control signals to the inverter 34, control signals to the system main relay SMR, control signals to the charging relay CHR, control signals to the solar DC/DC converter 73 and control signals to the boosting DC/DC converter 74. The ECU 50 calculates an electrical angle θe, an electrical angular velocity ωe and a rotation speed Nm of the motor 32, based on the rotational position θm of the rotor of the motor 32 input from the rotational position sensor 32a. The ECU 50 also calculates a state of charge SOCmb of the main battery 36, based on an integrated value of the electric current Imb of the main battery 36 input from the current sensor 36b. The ECU 50 further calculates a state of charge SOCsb of the solar battery 71, based on an integrated value of the electric current Isb of the solar battery 71 input from the current sensor 71b.

The electric vehicle 20 of the embodiment having the above configuration basically performs drive control described below. In the drive control, the ECU 50 sets a required torque Td* that is required for the driveshaft 26, based on the accelerator position Acc, the brake pedal position BP and the vehicle speed V, sets a torque command Tm* of the motor 32, such that the set required torque Td* is output to the driveshaft 26, and performs switching control of the plurality of switching elements included in the inverter 34, such that the motor 32 is driven with the set torque command Tm*. In the drive control, the ECU 50 also causes a hydraulic brake system (not shown) to apply a hydraulic braking force to the drive wheels 22a and 22b and to driven wheels (not shown) when the brake pedal 65 is depressed during a stop of the electric vehicle 20 (for example, when the electric vehicle 20 waits at a traffic light).

In the electric vehicle 20 of the embodiment, when permission is given for solar charging to supply the electric power from the solar system 70 through the power lines 38 to the main battery 36 or the like (i.e., when a solar charging permission/prohibition flag F described later is equal to a value 1), there is a solar charging request, and the charging relay CHR is ON, the ECU 50 controls the boosting DC/DC converter 74 to perform solar charging. The solar charging request is made, for example, when the state of charge SOCmb of the main battery 36 is equal to or lower than a reference value Srefm and the state of charge SOCsb of the solar battery 71 is equal to or higher than a reference value Srefs1. For example, when the solar charging request is subsequently cancelled, the ECU 50 stops the boosting DC/DC converter 74 to terminate solar charging.

Figure 2:
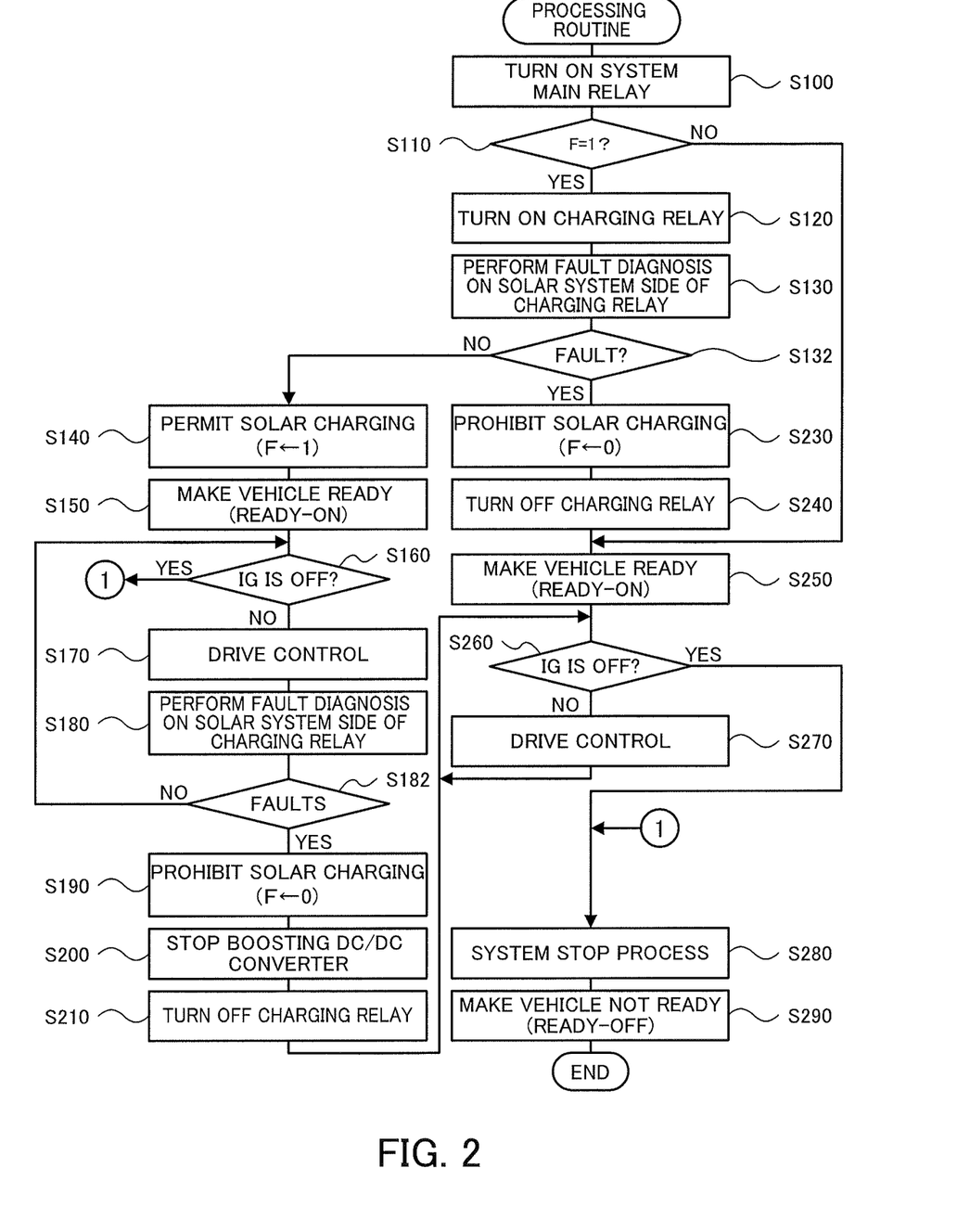
FIG. 2 is a flowchart showing one example of a processing routine performed by an ECU.

The following describes a series of operations of the electric vehicle 20 of the embodiment having the configuration described above. FIG. 2 is a flowchart showing one example of a processing routine performed by the ECU 50. This processing routine is triggered when the ignition switch 60 is turned ON.

When the processing routine of FIG. 2 is triggered, the ECU 50 turns ON the system main relay SMR (step S100) and checks the value of the solar charging permission/prohibition flag F (step S110). The solar charging permission/prohibition flag F is a flag that is set to a value 1 when solar charging is permitted, while being set to a value 0 when solar charging is prohibited. This solar charging permission/prohibition flag F is set by a procedure described later. The processing of step S110 is a process of determining whether solar charging has been permitted or prohibited at the end of a previous trip. The term "trip" herein denotes a period from an ON operation of the ignition switch 60 to the time of making the electric vehicle not ready (ready-off state, making the vehicle not ready to be driven) (step S290).

When it is determined at step S110 that the solar charging permission/prohibition flag F is equal to the value 1, the ECU 50 determines that solar charging has been permitted at the end of the previous trip. The ECU 50 accordingly turns ON the charging relay CHR (step S120) and performs short circuit fault diagnosis to determine whether a short circuit fault occurs on the solar system 70-side of the charging relay CHR (steps S130 and S132). A procedure employed for this short circuit fault diagnosis may, for example, compare the voltage VH2 of the capacitor 40 input from the voltage sensor 40*a* in the ON state of the charging relay CHR with a reference value VHref. When a short circuit fault occurs on the solar system 70-side of the charging relay CHR, electric current flows from the main battery 36 to the short circuit position. This is likely to cause a failure in output of the torque from the motor 32 and make it difficult to drive the electric vehicle 20 with the torque from the motor 32. According to the embodiment, the short circuit fault diagnosis on the solar system 70-side of the charging relay CHR is performed (to detect a short circuit fault when it occurs) for a time period from the ON operation of the ignition switch 60 to the time making the electric vehicle 20 ready (ready-on state, make the vehicle ready to be driven) (step S150 or step S250 described later), i.e., during a stop of the electric vehicle 20.

When it is determined at steps S130 and S132 that no short circuit fault occurs on the solar system 70-side of the charging relay CHR, the ECU 50 determines that solar charging is to be permitted, sets the solar charging permission/prohibition flag F to the value 1 (step S140), and makes the electric vehicle 20 ready (ready-on state) (step S150). In this case, the charging relay CHR is kept ON.

The ECU 50 subsequently determines whether the ignition switch 60 is OFF (step S160). When it is determined that the ignition switch 60 is not OFF, the ECU 50 performs the drive control described above (step S170). In this case, solar charging is permitted, and the charging relay CHR is kept ON. Accordingly, in response to a solar charging request, the ECU 50 drives the boosting DC/DC converter 74 to perform the solar charging.

The ECU 50 subsequently performs the short circuit fault diagnosis on the solar system 70-side of the charging relay CHR, like the processing of steps S130 and S132 (steps S180 and S182). When it is determined that no short circuit fault occurs on the solar system 70-side of the charging relay CHR, the ECU 50 returns the processing flow to step S160.

When it is determined at step S160 that the ignition switch 60 is OFF after repetition of the processing of steps S160 to S182, the ECU 50 performs a system stop process (step S280), makes the electric vehicle 20 Not Ready (step S290) and then terminates this processing routine. For example, the system stop process turns OFF the charging relay CHR when the charging relay CHR is ON, and then turns OFF the system main relay SMR.

When it is determined at steps S180 and S182 that a short circuit fault occurs on the solar system 70-side of the charging relay CHR, the ECU 50 determines that solar charging is to be prohibited and sets the solar charging permission/prohibition flag F to the value 0 (step S190). The ECU 50 stops the boosting DC/DC converter 74 when the boosting DC/DC converter 74 is being driven, i.e., terminates solar charging when the solar charging is being performed (step S200), and turns OFF the charging relay CHR (step S210). Turning OFF the charging relay CHR disconnects the main battery 36-side of the charging relay CHR from the capacitor 40- and the solar system 70-side of the charging relay CHR.

The ECU 50 subsequently determines whether the ignition switch 60 is OFF (step S260). When it is determined that the ignition switch 60 is not OFF, the ECU 50 performs the drive control described above (step S270) and returns the processing flow to step S260. In this case, solar charging is prohibited, so that the charging relay CHR is kept OFF, irrespective of whether there is a solar charging request or no solar charging request. This maintains the disconnection of the main battery 36-side of the charging relay CHR from the capacitor 40- and the solar system 70-side of the charging relay CHR. Accordingly, even in the case where a short circuit fault occurs on the solar system 70-side of the charging relay CHR, such disconnection enables the electric vehicle 20 to be driven as in the case where no short circuit fault occurs.

When it is determined at step S260 that the ignition switch 60 is OFF after repetition of the processing of steps S260 and S270, the ECU 50 performs the system stop process (step S280), makes the electric vehicle 20 not ready (ready-off state) (step S290) and then terminates this processing routine.

When it is determined at steps S130 and S132 that a short circuit fault occurs on the solar system 70-side of the charging relay CHR, on the other hand, the ECU 50 determines that solar charging is to be prohibited, sets the solar charging permission/prohibition flag F to the value 0 (step S230), turns OFF the charging relay CHR (step S240) and makes the electric vehicle 20 ready (ready-on state) (step S250). The ECU 50 then performs the processing of steps S260 to S290 described above and terminates this processing routine. Accordingly, when it is determined that a short circuit fault occurs on the solar system 70-side of the charging relay CHR prior to making the electric vehicle 20 ready (ready-on state), the electric vehicle 20 prohibits solar charging and keeps the charging relay CHR OFF until the electric vehicle 20 is made not ready (ready-off state) (until the end of a current trip). Accordingly, even in the case where a short circuit fault occurs on the solar system 70-side of the charging relay CHR, this configuration enables the electric vehicle 20 to be driven as in the case where no short circuit fault occurs.

When it is determined at step S110 that the solar charging permission/prohibition flag F is equal to the value 0, on the other hand, the ECU 50 determines that solar charging has been prohibited at the end of the previous trip (i.e., a short circuit fault has occurred on the solar system 70-side of the charging relay CHR since the previous trip or even a former trip). The ECU 50 accordingly keeps the solar charging permission/prohibition flag F to the value 0 without performing the short circuit fault diagnosis on the solar system 70-side of the charging relay CHR and makes the electric vehicle 20 ready (ready-on state) (step S250). This configuration shortens the time period from the ON operation of the ignition switch 60 to the time of making the electric vehicle 20 ready (ready-on state), compared with a configuration that unconditionally performs the short circuit fault diagnosis on the solar system 70-side of the charging relay CHR.

The ECU 50 then performs the processing of steps S260 to S290 described above and terminates this processing routine. When solar charging was prohibited at the end of the previous trip, the processing routine described above also prohibits solar charging and keeps the charging relay CHR OFF in the current trip. Accordingly, even in the case where a short circuit fault occurs on the solar system 70-side of the charging relay CHR, this configuration enables the electric vehicle 20 to be driven as in the case where no short circuit fault occurs. When the short circuit fault on the solar system 70-side of the charging relay CHR is eliminated by repairing at an automobile dealer or the like, the ECU 50 determines that solar charging is to be permitted and sets the solar charging permission/prohibition flag F to the value 1.

Figure 3:
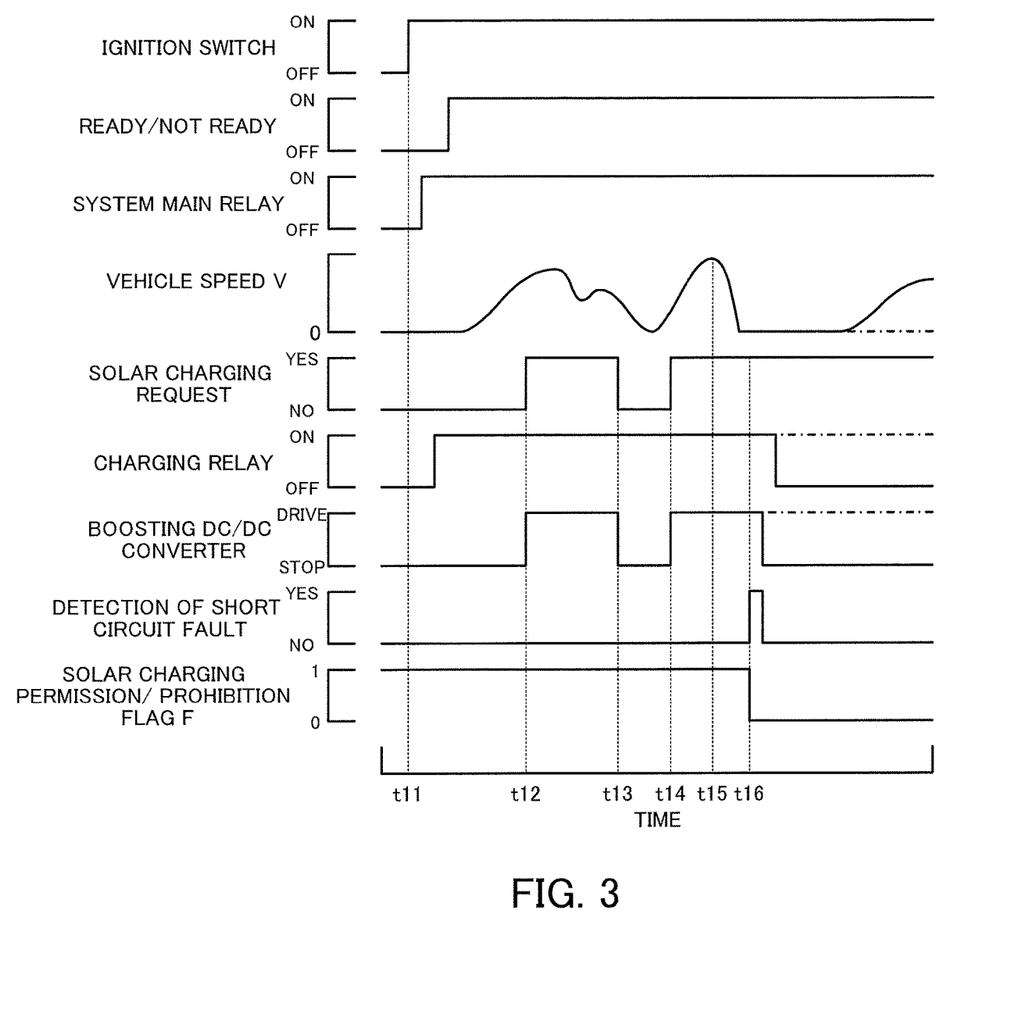
FIG. 3 is a diagram illustrating one example of the state of an ignition switch, the ready-on/ready-off state, the state of a system main relay SMR, the vehicle speed V, a solar charging request or no solar charging request, the state of a charging relay CHR, the state of a boosting DC/DC converter, detection or no detection of a short circuit fault on a solar system side of the charging relay CHR and the state of a solar charging permission/prohibition flag F.
Figure 4:
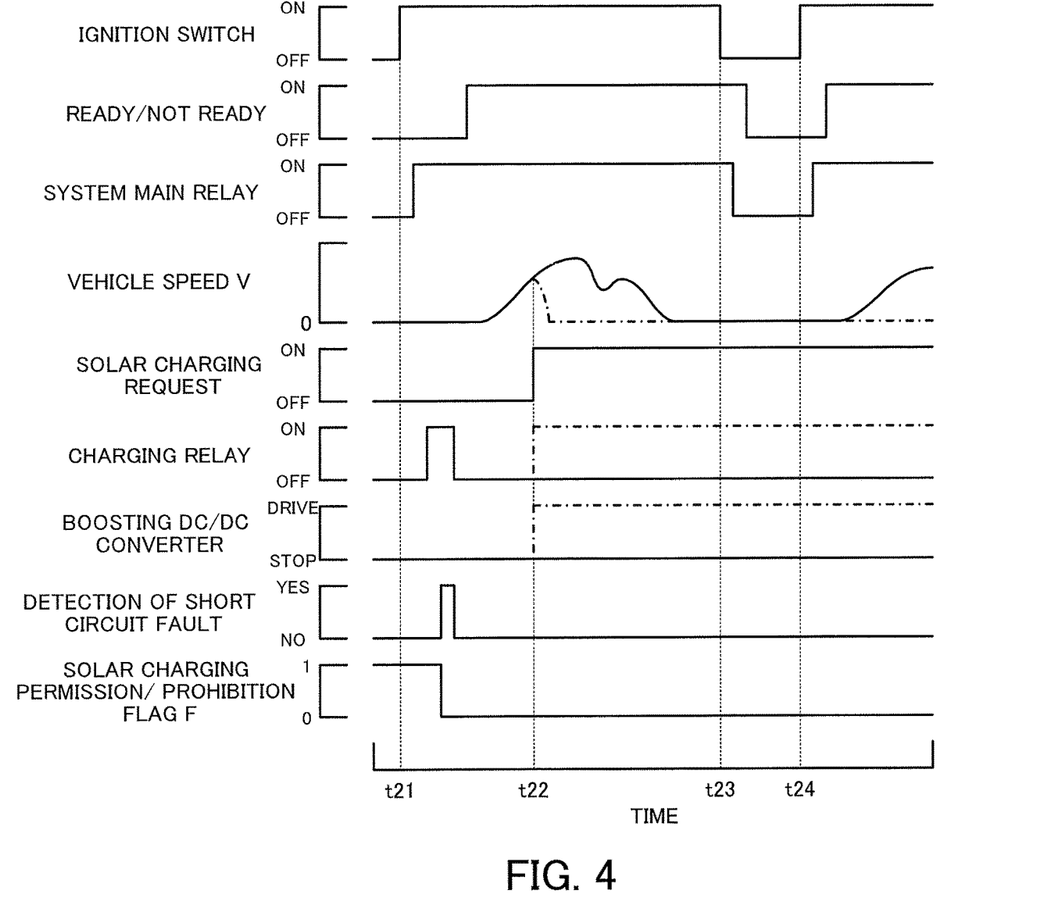
FIG. 4 is a diagram illustrating another example of the state of the ignition switch, the ready-on/ready-off state, the state of the system main relay SMR, the vehicle speed V, the solar charging request or no solar charging request, the state of the charging relay CHR, the state of the boosting DC/DC converter, detection or no detection of a short circuit fault on the solar system side of the charging relay CHR and the state of the solar charging permission/prohibition flag F.

FIG. 3 and FIG. 4 are diagrams illustrating examples of the state of the ignition switch 60, the ready-on/ready-off state, the state of the system main relay SMR, the vehicle speed V, the solar charging request or no solar charging request, the state of the charging relay CHR, the state of the boosting DC/DC converter 74, detection or no detection of a short circuit fault on the solar system 70-side of the charging relay CHR and the state of the solar charging permission/prohibition flag F.

In the illustrated example of FIG. 3, when the ignition switch 60 is turned ON (at a time t11), the ECU 50 turns ON the system main relay SMR, turns on the charging relay CHR and performs the short circuit fault diagnosis on the solar system 70-side of the charging relay CHR. When it is determined that no short circuit fault occurs on the solar system 70-side of the charging relay CHR, the ECU 50 determines that solar charging is to be permitted, sets the solar charging permission/prohibition flag F to the value 1, keeps the charging relay CHR ON and makes the electric vehicle 20 ready (ready-on state).

In response to a solar charging request (from a time t12 to a time t13) under the drive control, the ECU 50 drives the boosting DC/DC converter 74 to perform solar charging. When a short circuit fault occurs on the solar system 70-side of the charging relay CHR (at a time t15) during solar charging in response to the solar charging request (for a time period from a time t14), electric current flows from the main battery 36 to the short circuit position. This reduces the torque output from the motor 32 and decreases the vehicle speed V. In response to detection of a short circuit fault occurring on the solar system 70-side of the charging relay CHR (at a time t16), the ECU 50 determines that solar charging is to be prohibited, sets the solar charging permission/prohibition flag F to the value 0, stops the boosting DC/DC converter 74 to terminate solar charging, and turns OFF the charging relay CHR.

After that, the ECU 50 keeps the charging relay CHR OFF and keeps the boosting DC/DC converter 74 at stop, irrespective of a subsequent solar charging request. This maintains the disconnection of the main battery 36-side of the charging relay CHR from the capacitor 40- and the solar system 70-side of the charging relay CHR. Unlike the configuration of a comparative example that turns ON the charging relay CHR and drives the boosting DC/DC converter 74 in response to a solar charging request (shown by one-dot chain line curves in FIG. 3), this configuration enables the electric vehicle 20 to be driven as in the case where no short circuit fault occurs on the solar system 70-side of the charging relay CHR.

In the illustrated example of FIG. 4, when the ignition switch 60 is turned ON (at a time t21), the ECU 50 turns ON the system main relay SMR, turns on the charging relay CHR and performs the short circuit fault diagnosis on the solar system 70-side of the charging relay CHR. In response to detection of a short circuit fault occurring on the solar system 70-side of the charging relay CHR, the ECU 50 determines that solar charging is to be prohibited, sets the solar charging permission/prohibition flag F to the value 0, turns OFF the charging relay CHR and makes the electric vehicle 20 ready (ready-on state).

Irrespective of a solar charging request (for a time period from a time t22) under the drive control, the ECU 50 keeps the charging relay CHR OFF and keeps the boosting DC/DC converter 74 at stop. Unlike the configuration of the comparative example described above (shown by one-dot chain line curves in FIG. 4), even in the case where a short circuit fault occurs on the solar system 70-side of the charging relay CHR, this configuration enables the electric vehicle 20 to be driven as in the case where no short circuit fault occurs.

When the ignition switch 60 is turned OFF (at a time t23), the ECU 50 turns OFF the system main relay SMR and makes the electric vehicle 20 Not Ready. When the ignition switch 60 is subsequently turned ON (at a time t24), the ECU 50 turns ON the system main relay SMR, keeps the charging relay CHR OFF based on the setting of the solar charging permission/prohibition flag F to the value 0 (without turning ON the charging relay CHR and performing the short circuit fault diagnosis on the solar system 70-side of the charging relay CHR) and makes the electric vehicle 20 ready (ready-on state). In this case, this configuration does not turn ON the charging relay CHR and thereby does not perform the short circuit fault diagnosis on the solar system 70-side of the charging relay CHR. This configuration accordingly shortens the time period from the ON operation of the ignition switch 60 to the time of making the electric vehicle 20 ready (ready-on state).

In this trip, irrespective of a solar charging request (for a time period from a time t24), the ECU 50 keeps the charging relay CHR OFF and keeps the boosting DC/DC converter 74 at stop. Unlike the configuration of the comparative example described above (shown by one-dot chain line curves in FIG. 4), even in the case where a short circuit fault occurs on the solar system 70-side of the charging relay CHR, this configuration enables the electric vehicle 20 to be driven as in the case where no short circuit fault occurs.

As described above, in response to detection of a short circuit fault occurring on the solar system 70-side of the charging relay CHR in the ON state of the charging relay CHR in the current trip, the electric vehicle 20 of the embodiment turns OFF the charging relay CHR and keeps the charging relay CHR OFF at least in the current trip. This configuration maintains the disconnection of the main battery 36-side of the charging relay CHR from the capacitor 40- and the solar system 70-side of the charging relay CHR. This configuration accordingly enables the electric vehicle 20 to be driven as in the case where no short circuit fault occurs on the solar system 70-side of the charging relay CHR.

In response to an ON operation of the ignition switch 60, the electric vehicle 20 of the embodiment turns ON the charging relay CHR and performs the short circuit fault diagnosis on the solar system 70-side of the charging relay CHR. When it is determined that no short circuit fault occurs on the solar system 70-side of the charging relay CHR, the electric vehicle 20 of the embodiment is driven with the charging relay CHR kept ON. When it is determined that no short circuit fault occurs on the solar system 70-side of the charging relay CHR, a modification may, however, turn ON the charging relay CHR in response to the start of a solar charging request and turn OFF the charging relay CHR in response to the end of the solar charging request.

The electric vehicle 20 of the embodiment performs the short circuit fault diagnosis on the solar system 70-side of the charging relay CHR in the ON state of the charging relay CHR for a time period from an ON operation of the ignition switch 60 to the time of making the electric vehicle 20 ready (ready-on state) as well as after the time of making the electric vehicle 20 ready (ready-on state). A modification may, however, not perform the short circuit fault diagnosis on the solar system 70-side of the charging relay CHR in the ON state of the charging relay CHR for the time period from the ON operation of the ignition switch 60 to the time of making the electric vehicle 20 ready (read-on state).

In the case where solar charging has been prohibited at the end of the previous trip (i.e., in the case where a short circuit fault has occurred on the solar system 70-side of the charging relay CHR since the previous trip or even a former trip), the electric vehicle 20 of the embodiment is made ready (ready-on state) in response to an ON operation of the ignitions witch 60 without performing the short circuit fault diagnosis on the solar system 70-side of the charging relay CHR. In response to an ON operation of the ignition switch 60, a modification may, however, perform the short circuit fault diagnosis on the solar system 70-side of the charging relay CHR and then make the electric vehicle 20 ready (ready-on state), irrespective of whether solar charging has been prohibited at the end of the previous trip.

The electric vehicle 20 of the embodiment uses the main battery 36 as the power storage device. A modification may use a capacitor for the power storage device.

The embodiment describes the aspect of the present disclosure applied to the configuration of the electric vehicle 20 that includes the motor 32 for driving, the main battery 36, the solar system 70 and the charging relay CHR. The aspect of the present disclosure may, however, be applicable to a vehicle of any configuration including a motor for driving, a power storage device, a solar system and a charging relay. For example, the aspect of the present disclosure may be applied to the configuration of a parallel hybrid vehicle or a series hybrid vehicle including an engine, in addition to the motor 32 for driving, the main battery 36, the solar system 70 and the charging relay CHR or may be applied to the configuration of a fuel cell vehicle including a fuel cell, in addition to the motor 32 for driving, the main battery 36, the solar system 70 and the charging relay CHR.

In the vehicle according to the present disclosure, in response to an instruction of a system start, the control device may turn on the charging relay and perform short circuit fault diagnosis on the solar system side of the charging relay, and when the short circuit fault diagnosis determines that a short circuit fault occurs on the solar system side of the charging relay, the control device may turn off the charging relay, subsequently make the vehicle ready (make the vehicle ready to be driven), and keep the charging relay off at least in the current trip. This configuration enables a short circuit fault on the solar system side of the charging relay to be detected for a time period from an instruction of a system start to the time of making the vehicle ready, i.e., during a stop of the vehicle.

In the vehicle according to the present disclosure that performs short circuit fault diagnosis on the solar system side of the charging relay in response to an instruction of a system start, when the short circuit fault diagnosis determines that no short circuit fault occurs on the solar system side of the charging relay prior to making the vehicle ready, the control device may subsequently perform the short circuit fault diagnosis in the on state of the charging relay, and when the short circuit fault diagnosis determines that a short circuit fault occurs on the solar system side of the charging relay, the control device may keep the charging relay off at least in the current trip.

In the vehicle according to the present disclosure that performs short circuit fault diagnosis on the solar system side of the charging relay in response to an instruction of a system start, when the short circuit fault diagnosis determines that a short circuit fault occurs on the solar system side of the charging relay in a previous trip, the control device may make the vehicle ready without performing the short circuit fault diagnosis in the current trip and keep the charging relay off in the current trip. This configuration shortens the time period from the instruction of the system start to the time of making the vehicle ready.

The following describes the correspondence relationship between the primary elements of the above embodiment and the primary elements of the disclosure described in Summary. The motor 32 of the embodiment corresponds to the "motor", the main battery 36 corresponds to the "power storage device", the solar system 70 corresponds to the "solar system", the charging relay CHR corresponds to the "charging relay", and the ECU 50 corresponds to the "control device".

The correspondence relationship between the primary components of the embodiment and the primary components of the present disclosure, regarding which the problem is described in Summary, should not be considered to limit the components of the present disclosure, regarding which the problem is described in Summary, since the embodiment is only illustrative to specifically describes the aspects of the present disclosure, regarding which the problem is described in Summary. In other words, the present disclosure, regarding which the problem is described in Summary, should be interpreted on the basis of the description in Summary, and the embodiment is only a specific example of the present disclosure, regarding which the problem is described in Summary.

The aspect of the present disclosure is described above with reference to the embodiment. The present disclosure is, however, not limited to the above embodiment but various modifications and variations may be made to the embodiment without departing from the scope of the present disclosure.

INDUSTRIAL APPLICABILITY

The disclosure is applicable to, for example, the manufacturing industries of vehicles.

What is claimed is:
1. A vehicle, comprising:
a motor for driving;
a power storage device configured to transmit electric power to and from the motor;
a solar system configured to generate electric power from sunlight and to perform solar charging that supplies the generated electric power to the power storage device;
a charging relay turned on and off to connect and disconnect the solar system with and from the power storage device; and
a control device configured to control the motor, the solar system and the charging relay, wherein
when a short circuit fault occurring on a solar system side of the charging relay is detected in an on state of the charging relay in a current trip, the control device turns off the charging relay and keeps the charging relay off at least in the current trip, wherein in response to an instruction of a system start, the control device turns on the charging relay and performs short circuit fault diagnosis on the solar system side of the charging relay, and when the short circuit fault diagnosis determines that a short circuit fault occurs on the solar system side of the charging relay, the control device turns off the charging relay, subsequently makes the vehicle ready, and keeps the charging relay off at least in the current trip.

2. The vehicle according to claim 1, wherein when the short circuit fault diagnosis determines that no short circuit fault occurs on the solar system side of the charging relay prior to making the vehicle ready, the control device subsequently performs the short circuit fault diagnosis in the on state of the charging relay, and when the short circuit fault diagnosis determines that a short circuit fault occurs on the solar system side of the charging relay, the control device keeps the charging relay off at least in the current trip.

3. The vehicle according to claim 1, when the short circuit fault diagnosis determines that a short circuit fault occurs on the solar system side of the charging relay in a previous trip, the control device makes the vehicle ready without performing the short circuit fault diagnosis in the current trip and keeps the charging relay off in the current trip.

4. The vehicle according to claim 2, when the short circuit fault diagnosis determines that a short circuit fault occurs on the solar system side of the charging relay in a previous trip, the control device makes the vehicle ready without performing the short circuit fault diagnosis in the current trip and keeps the charging relay off in the current trip.

* * * * *